(12) United States Patent
Miyoshi et al.

(10) Patent No.: US 6,615,685 B2
(45) Date of Patent: Sep. 9, 2003

(54) AUTOMOTIVE PEDAL SUPPORT STRUCTURE

(75) Inventors: Keisuke Miyoshi, Aki-gun (JP); Hiroyuki Utsumi, Aki-gun (JP); Masamitsu Tanaka, Aki-gun (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 09/925,510

(22) Filed: Aug. 10, 2001

(65) Prior Publication Data

US 2002/0020248 A1 Feb. 21, 2002

(30) Foreign Application Priority Data

Aug. 11, 2000 (JP) ........................................ 2000-244707

(51) Int. Cl.[7] ................................................ G05G 1/14
(52) U.S. Cl. ........................................ 74/512; 180/274
(58) Field of Search ........................ 74/492, 493, 512, 74/560; 180/274; 280/777, 784

(56) References Cited

U.S. PATENT DOCUMENTS

| | | | | |
|---|---|---|---|---|
| 4,875,385 A | * | 10/1989 | Sitrin | 74/512 |
| 5,685,564 A | * | 11/1997 | Iijima et al. | 280/777 |
| 6,041,674 A | * | 3/2000 | Kato | 74/512 |
| 6,276,483 B1 | * | 8/2001 | Sinnhuber et al. | 180/274 |
| 6,339,971 B1 | * | 1/2002 | Kato | 74/512 |
| 6,408,711 B1 | * | 6/2002 | Mizuma et al. | 74/512 |

OTHER PUBLICATIONS

Patent Abstracts of Japan, Publication No. 10–175492, Jun. 30, 1998 "Pedal Displacement Control Structure of Vehicle".
Patent Abstracts of Japan, Publication No. 07–165088, Jun. 27, 1995 "Steering Supporting Device for Vehicle and Assembling Method Thereof".

* cited by examiner

*Primary Examiner*—William C Joyce
*Assistant Examiner*—Timothy McAnulty
(74) *Attorney, Agent, or Firm*—Nixon Peabody LLP; Donald R. Studebaker

(57) ABSTRACT

To avoid a steering shaft changing its orientation during a frontal collision, an automotive pedal support structure equipped with an operating pedal is disposed behind a dash panel of an automotive vehicle and the steering shaft comprising a universal joint disposed in the proximity of the operating pedal. Provided are a first bracket including first and second side wall portions, a connecting portion and a second bracket pivoted to the first bracket so as to be rotated during the frontal collision. The operating pedal is pivoted to the second bracket. During the frontal collision, the universal joint is longitudinally moved relative with respect to the first bracket while contacting with side surfaces of the first and second side wall portions.

4 Claims, 6 Drawing Sheets

AUTOMOTIVE PEDAL SUPPORT STRUCTURE

TECHNICAL FIELD OF THE INVENTION

The present invention relates to an automotive pedal support structure equipped with an operating pedal disposed behind an automotive dash panel and a steering shaft comprising a universal joint disposed in the proximity of the operating pedal.

BACKGROUND OF THE INVENTION

A pedal support structure where a bracket to which the operating pedal is pivoted is attached to a dash panel through a bucklingly transformable collar is known, for example from Japanese Patent Publication No. 10-175492. This tries to prevent the operating pedal from being thrown rearwardly by bucklingly transforming the collar during an automotive frontal collision.

Since a steering shaft is disposed so as to extend in the longitudinal direction of vehicular body in the proximity of the operating pedal, a universal joint of the steering shaft may be positioned in the proximity of the operating pedal.

In this case, during a frontal collision a rearward movement of the operating pedal might cause the operating pedal to contact the universal joint and push it which may cause the steering shaft to incline and change its orientation. In the case that an air bag is arranged at the steering wheel, such an orientational change in the steering shaft may offset the deployment direction of the air bag.

Also in a steering shaft support structure with a so called tilt mechanism which allows for adjustment of the steering shaft position in the vertical direction, when the operating pedal pushes the universal joint, the steering shaft may change its orientation in the vertical direction. Particularly, as described in Japanese Patent Publication No. 7-165088 when a pivot portion which pivots the steering shaft against the vehicular body member is provided in the front position of the steering shaft, the steering shaft may greatly change its orientation upon experiencing a frontal collision.

SUMMARY OF THE INVENTION

The present invention is directed to an automotive pedal support structure for avoiding a steering shaft from changing its orientation during a frontal collision. The automotive pedal support structure is equipped with an operating pedal disposed behind a dash panel of an automotive vehicle and a steering shaft comprising a universal joint disposed in the proximity of the operating pedal.

To achieve the above object, the present invention avoids the interference between the operating pedal and the steering shaft.

The automotive pedal support structure is equipped with a first bracket including a side wall portion attached to the dash panel so as to extend rearwardly. The operating pedal is placed in front of the universal joint and pivots to the first bracket oppositely to the universal joint with respect to the first bracket.

Further, the automotive pedal support structure is arranged so that during an automotive frontal collision the universal joint moves relative to the first bracket in the longitudinal direction while contacting with a side surface of the side wall portion of first bracket accompanied with the rearward movement of the dash panel.

According to the first aspect of the invention, when the first bracket and the operating pedal pivotably connected to the first bracket move rearwardly during a frontal collision, the universal joint moves relative to the first bracket along the side surface of the side wall portion in the longitudinal direction while contacting the side wall portion of the first bracket. At this time, since the operating pedal is disposed oppositely to the universal joint with respect to the side wall portion, the interference between the operating pedal and the universal joint is prevented by the side wall portion. Further, since the universal joint slides on the side surface of the side wall portion, the universal joint will not be pushed in the longitudinal or the vehicular width directions. Accordingly, changing of the orientation of the steering shaft is certainly avoided.

According to the first aspect of the invention, since the interference between the operating pedal and the universal joint is avoided as well as the universal joint being pushed, the change of the steering shaft orientation during the frontal collision is certainly avoided, even in the case of a steering shaft support structure with a tilt mechanism or even if a pivot portion is provided in the front position of the steering shaft.

In accordance with a second aspect of the invention, the first bracket is equipped with a pair of side wall portions which are spaced apart from each other in the vehicular width direction and a connecting portion which connects the pair of side walls with each other in the vehicular width direction.

Further, the operating pedal is pivotably connected to the first bracket between the pair of side walls and the universal joint is positioned oppositely to the operating pedal with respect to either one of the side wall portions of first bracket. This relates to the fact that when the side wall portion is deformed due to the contact of the universal joint with the side wall portion of first bracket, the operating pedal might interfere with the universal joint.

Then, with respect to the second aspect of the invention, by connecting the pair of side wall portions with each other using the connecting portion, rigidity of the side wall portions in the vehicular width direction is increased. Consequently, the deformation of the side wall portions is prevented when the universal joint contacts the first bracket, and the universal joint will move relatively more certainly along the side surface of the side wall portions, such that the interference between the operating pedal and the universal joint is more reliably prevented and that the changing of the steering shaft orientation is more reliably prevented.

In the third aspect of the invention, a second bracket is provided, a front end lower portion of which is pivoted to the first bracket and an upper portion of which is detachably attached to the vehicle body member so as to detach from the vehicle body by rearward movement during the automotive frontal collision. Further the operating pedal is pivotably connected to the second bracket.

According to the third aspect of the invention, since normally the front end lower portion of second bracket is pivoted to the first bracket while the upper portion is attached to the vehicular body side member, the second bracket will be integrated with the first bracket and the stepping operation of the operating pedal rotatably pivoted to the second bracket will be enabled.

In contrast with this, when the dash panel moves rearwardly during the frontal collision, the first bracket attached to the dash panel, the operating pedal and the second bracket which supports the operating pedal will move together rearwardly, the upper portion of this second bracket will be released from the body side member due to the rearward movement of the second bracket and the second bracket will be in a cantilever condition where it is supported at its front end lower portion by the first bracket. At this time the second bracket in the cantilever condition will be released from the vehicular body member while rotating rearwardly around a pivoting point of the front end lower portion as a rotation center along with the operating pedal, whereby the operating pedal rotates to move a lower pedal portion forwardly. Since in this manner the rearward movement of the operating pedal is avoided, the interference between the operating pedal and the universal joint is more reliably avoided.

In the forth aspect of the invention, an automotive pedal support structure is provided which is equipped with an operating pedal arranged behind a dash panel of an automotive vehicle and a steering shaft comprising a universal joint arranged in the proximity of the operating pedal. The support structure also comprises a pivot portion which pivots the steering shaft with respect to the vehicular body member at a front position of the steering shaft and a variable support portion which supports the steering shaft variably in its position in a substantially vertical direction with respect to the vehicular body member at its rear position. The support structure further comprises a first bracket having a side wall portion attached to the dash panel so as to extend rearwardly, and a second bracket with its front end lower portion being pivotally connected to the first bracket and its upper portion being attached to the vehicular body member so that it moves rearwardly to be released from the vehicle body side member during an automotive frontal collision.

The operating pedal is rotatably pivoted to the second bracket so as to be positioned between the pair of side wall portions of first bracket and the universal joint is positioned oppositely to the operating pedal with respect to either one of the side wall portions of first bracket.

The universal joint is constructed so that during an automotive frontal collision, the universal joint can move in the longitudinal direction relative to the first bracket while contacting with the side wall portion of first bracket due to a rearward movement of the dash panel.

According to the forth aspect of the invention, the similar function and effect to those of the first through third aspects can be obtained. Accordingly, since the interference itself between the operating pedal and the universal joint is avoided as well as the universal joint being pushed, a change in steering shaft orientation is certainly avoided during the frontal collision even if the pivot portion is provided in the front position of steering shaft.

As explained above, according to the automotive pedal support structure of this invention, the interference between the operating pedal and the steering shaft during the frontal collision can be avoided since the universal joint moves relative to the first bracket in the longitudinal direction while contacting with the side surface of side wall portions of the first bracket.

Also the present invention more certainly avoids the interference between the operating pedal and the universal joint, since the operating pedal is rotated so that the lower pedal portion moves forwardly during the frontal collision by pivoting the operating pedal to the second bracket.

Accordingly, the universal joint of the steering shaft is prevented from being pushed into the steering shaft which would otherwise change the steering shaft orientation during the frontal collision.

DETAILED DESCRIPTION OF THE INVENTION

Embodiments of this invention will be described with reference to the above described drawings.

Figure 1:
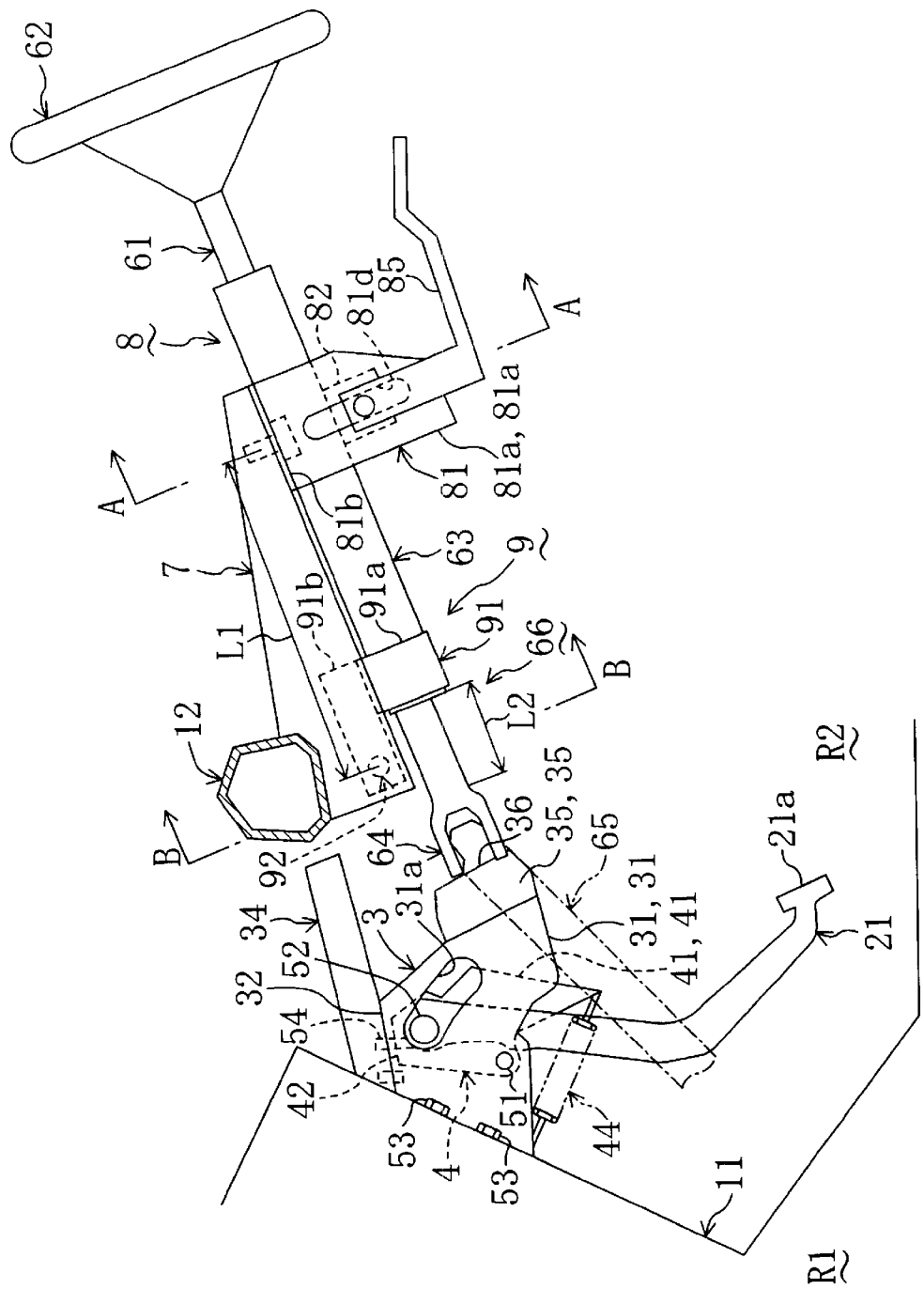
FIG. 1 is a side view illustrating an overall construction of an embodiment of this invention.
Figure 2:
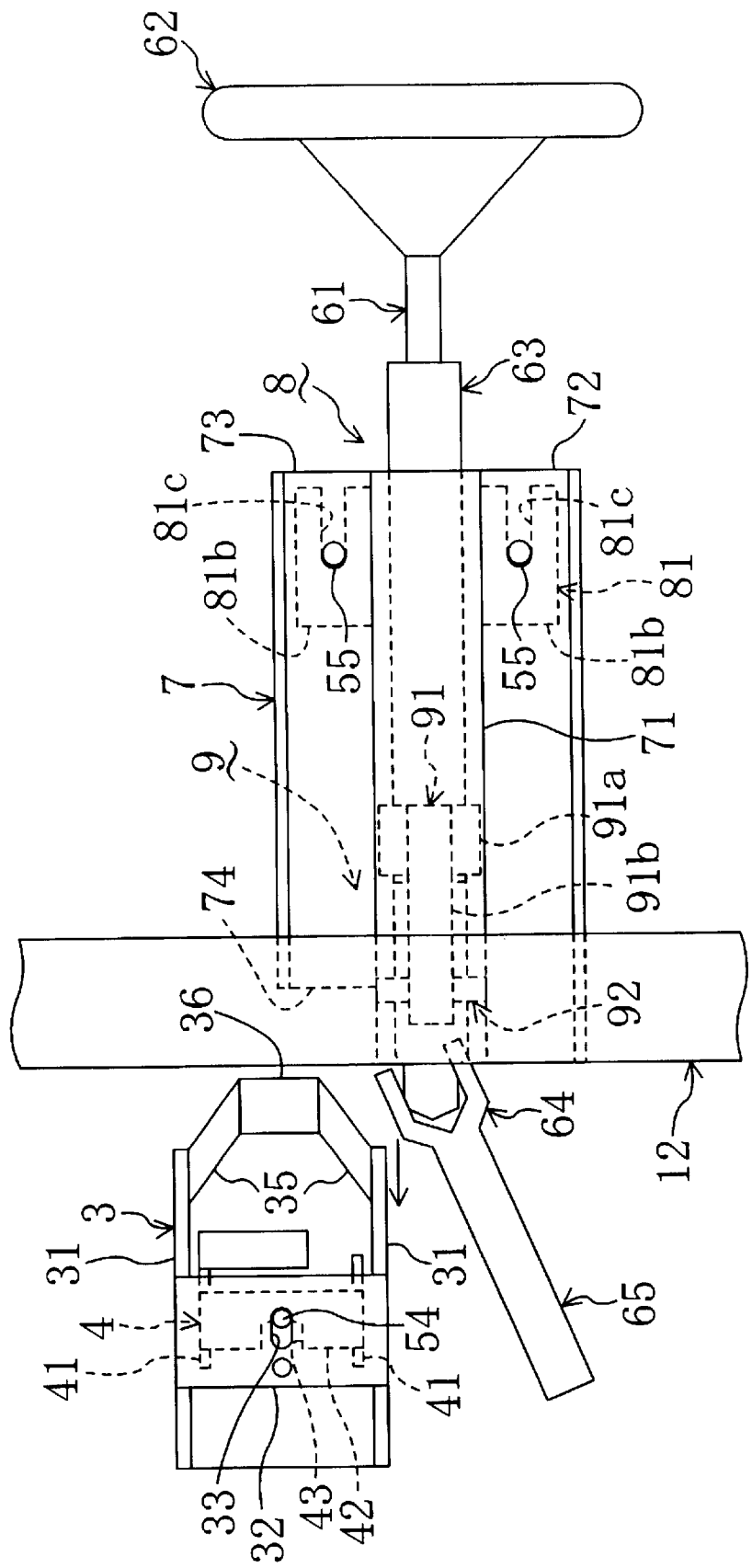
FIG. 2 is a plan view illustrating the overall construction of the embodiment of this invention.
Figure 3:
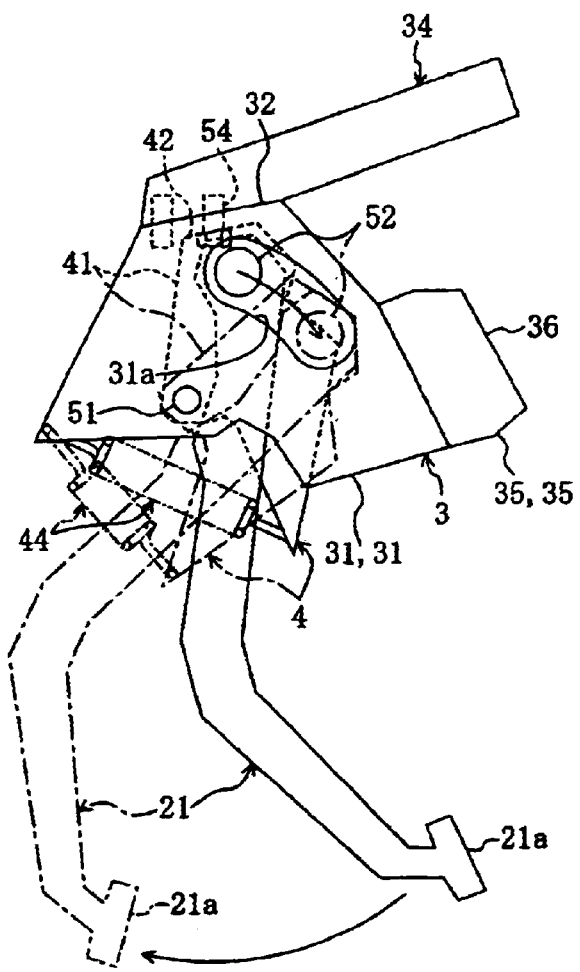
FIG. 3 is side view illustrating an enlarged pedal support structure portion.

FIGS. 1 and 2 show an overall arrangement of a preferred embodiment of the present invention wherein a dash panel 11 constitutes a part of a vehicular body of an automotive vehicle in front of which (in the left side of the figures) an engine compartment R1 where an engine (not shown) is received and in the rear part of which (in the right side of the figures) a passenger compartment R2 are respectively sectioned and formed. In the passenger compartment R2, the instrument panel member 12 is disposed extending in the vehicular width direction and this instrument panel member 12 is a vehicular body member with a structure which does not move rearwardly so as to assure passenger space within the passenger compartment R2 during a frontal collision.

Behind the lower portion of the dash panel 11, which is a front end portion of a lower portion of the passenger compartment R2, a brake pedal 21 is disposed as a operating pedal which is stepped on and operated by a driver sitting on a driver seat (not shown). Also in a position offset in the vehicular width direction with respect to this brake pedal 21, a steering shaft 61 is disposed which extends at an angle from the rear upper side to the front lower side. For purposes of clarity, in FIG. 2, an illustration of the brake pedal is omitted.

Initially, the arrangement of the brake pedal 21 will be explained with reference to FIGS. 1 through 4, wherein a first bracket 3 is affixed to a rear surface of the lower portion of the dash panel 11 with bolt members 53, 53.

The first bracket 3 comprises a pair of plate-shaped first side wall portions 31, 31 attached to the dash panel 11 so as to extend rearwardly therefrom. This pair of first side wall portions 31, 31 are attached so as to be separated from each other in the vehicular width direction and parallel to each other.

In the upper end portion at the substantially center position in the longitudinal direction of this pair of first side wall portions 31, 31, an upper wall portion 32 is provided which extends in the vehicular width direction to connect both of first side wall portions 31, 31. In the upper side of the upper wall portion 32, a fixing member 34 as a vehicular body member is attached with a fastening bolt 54. The fixing member 34 is disposed extending rearwardly so as to be directed toward the instrument panel member 12 disposed extending in the vehicular width direction. Also in the upper wall portion 32, as enlarged and illustrated in FIG. 4, an elongated aperture 33 is formed which has a smaller width than an outer diameter of a head portion 54a of the fastening bolt 54 and extends in the longitudinal direction.

In the rear upper portions of respective first wall portions 31, window portions 31a are formed extending substantially arcuately from the front upper portion to the rear lower portion. In this window portion 31a, a pedal support shaft 52 is disposed which will be described later.

Then in rear ends of the pair of first side wall portions 31, a pair of second side wall portions 35 are provided extending rearwardly so as to approach each other. The rear ends of these second side wall portions 35 are at a substantially same position in the longitudinal direction as a universal joint 64 of the steering shaft. The rear end portions of this pair of second wall portions 35 are connected by a connecting portion 36 extending in the vehicular width direction, whereby rigidity of the first and second side wall portions 31, 35 in the vehicular width direction is improved. The first and second side wall portions 31, 35 combine to construct the side wall portion of the first bracket 3.

Between the pair of first side wall portions 31, 31 of the first bracket 3, a second bracket 4 is disposed so as to be overlapped with the first side wall portions 31 as seen from the vehicular width direction.

This second bracket 4, which is similar to the first bracket 3, comprises a pair of side wall portions 41, 41 spaced from each other in the vehicular width direction and an upper wall portion 42 connecting the upper end portions of this pair of side wall portions 41, 41 with each other and it has a reverse U-shaped section opening downwardly.

A front end lower portion of the side wall portion 41 is pivoted with respect to a center lower portion of the first side wall portion 31 of the first bracket 3 with a caulking pin 51. On the other hand, the upper wall portion 42 of the second bracket 4 is mounted to the fixing member 34 so as to move rearwardly 50 to be released during the automotive frontal collision.

Figure 4:
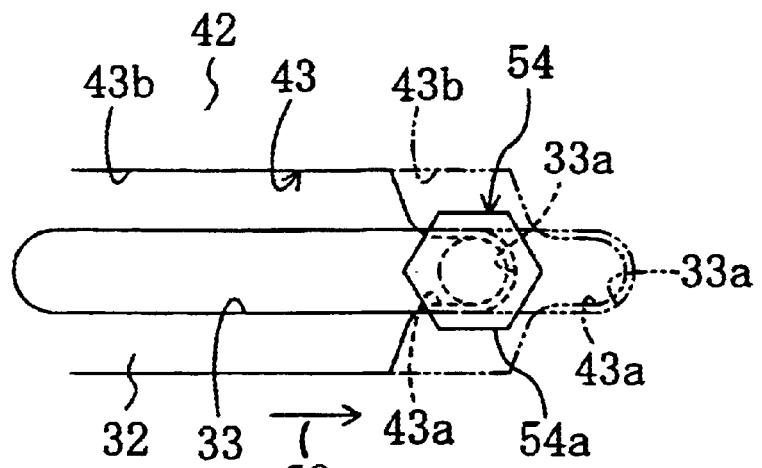
FIG. 4 is a plan view schematically illustrating an attachment structure of an upper portion of both the brackets.

That is, the upper wall portion 42 of the second bracket 4 is positioned so as to be overlapped with the lower side of the upper wall portion 32 of the first bracket 3. In the upper wall portion 42 of the second bracket 4, an elongated aperture 43 extending in the longitudinal direction is formed as illustrated in FIG. 4. Being different from the elongated aperture 33 of the first bracket 3, this elongated aperture 43 comprises a narrower portion 43a which is positioned in the rear end portion and has a smaller width than an outer diameter of the head portion 54a of the fastening bolt 54 and a wider portion 43b which continues in front of the narrower portion 43a and has a larger width than an outer diameter of the head portion 54a of the fastening bolt 54. By aligning the narrower portion 43a at the rear end of this elongated aperture 43 with the rear end portion of 33a of the elongated aperture 33 of the first bracket 3, inserting the fastening bolt 54 into the narrower portion 43a and the rear end portion 33a and fastening them to the fixing member 34, the upper portion of the second bracket 4 is fixedly mounted to the fixing member 34 along with the upper portion of the first bracket 3. Consequently, when the second bracket 4 moves rearwardly with the first bracket 3 during the frontal collision, the upper portion of the first bracket 3 is not released from the fixing member 34 while only the fastening bolt 54 moves forwardly relative to the rear end portion 33a, but in the upper portion of the second bracket 4, as shown with two-dot chain line in FIG. 4, the fastening bolt 54 moves from the narrower portion 43a of the rear end to the frontal wider portion 43b. At this wider portion 43b, the head portion 54a of the fastening bolt 54 will pass out of the aperture 43. By this, the upper portion of the second bracket 4 is attached to the fixing member 34 so that it rearwardly moves to be released during the automotive frontal collision.

Then, between the side wall portions 41, 41 in the proximity of the upper end portion of the second bracket 4, the pedal support shaft 52 is spanned extending in the vehicular width direction. To pedal support shaft 52, an upper end portion of the brake pedal 21 is rotatably attached. The brake pedal 21 is of an elongated plate-shape and at its lower end portion a pedal portion 21a is provided which a driver puts his foot on and steps down. Further, lateral end portions of the pedal support shaft 52 are displaced to protrude into the window portions 31a of the first bracket 3.

Also one end of a coil spring 44 is affixed to the lower rear end portion of the second bracket 4 while the other end of the coil spring 44 is affixed to the front end portion of the first bracket 3. The coil spring 44 is normally (in the condition shown in FIG. 1) in a tensioned condition.

Although not illustrated, an operating rod which is connected through a master back to a master cylinder of a brake apparatus positioned in a rear end portion of the engine compartment R1 is connected to a middle portion of the brake pedal 21. When the brake pedal 21 is rotated in the clockwise direction in FIG. 1 by stepping on the pedal portion 21a of the brake pedal 21, the pedal forwardly pushes the operating rod to actuate the master back. Then, the master cylinder actuates the brake while the master back increases the pressured force against the master cylinder.

Next describing an arrangement structure of the steering shaft 61 with reference to FIGS. 1, 2, 5 and 6, a steering wheel 62 is attached to a rear end portion of the steering shaft 61. Also, the steering shaft 61 is borne by a steering column 63.

A universal joint 64 is provided at the lower end in a shaft axis direction of the steering shaft 61. Through the universal joint 64, the steering shaft 61 and a middle shaft 65 are connected with each other. Accordingly, the brake pedal is positioned in front of the universal joint 64 and opposite to the universal joint 64 with respect to the first and second wall portions 31, 35 of the first bracket 3. Further, the lower end of the middle shaft 65 is connected to a steering gear box not shown.

In a front section of the steering column 63, a collapse portion 66 is provided which absorbs energy applied in the shaft axis direction. This collapse portion 66 is constituted by a part of an inner tube being inserted into an outer tube and arranged so that a predetermined load input causes the inner tube to extend further into the outer tube. The length of this collapse portion 66 in the shaft axis direction, that is a collapsing area of the collapse portion 66, is set to be a length L2.

The steering column 63 is supported by a steering bracket 7 affixed to a lower portion of the instrument panel member 12 by welding. This steering bracket 7 is disposed so as to extend rearwardly and upwardly at an angle from the instrument panel member 12.

Figure 5:
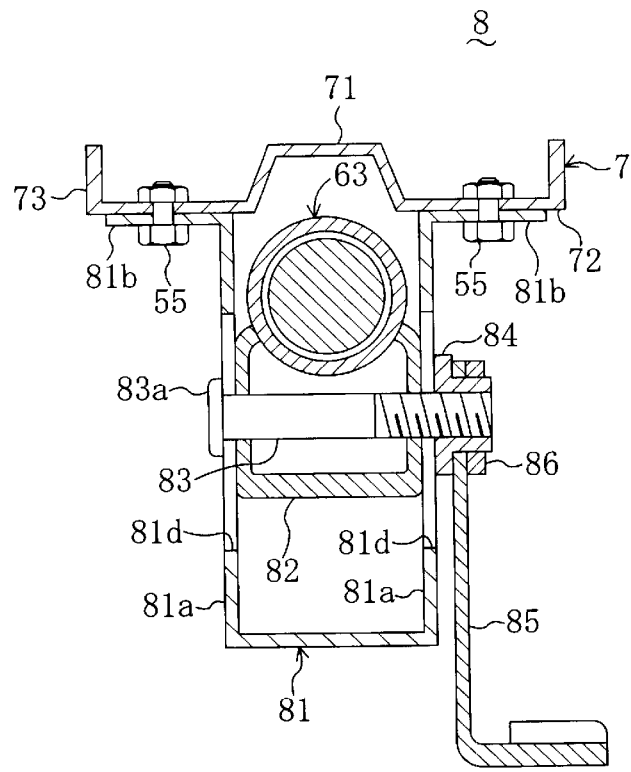
FIG. 5 is a sectional view illustrating an A—A section of FIG. 1.
Figure 6:
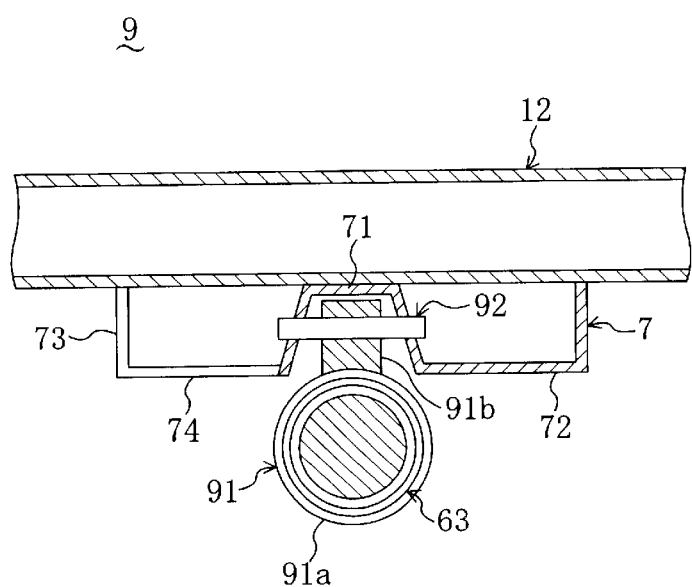
FIG. 6 is a sectional view illustrating a B—B section of FIG. 1.

The steering bracket 7, as shown in FIGS. 5 and 6, is formed into a substantially W-shaped section with a center wall portion 71 extending in the vehicular longitudinal direction and a side reinforcement portions 72 and 73. Also a cutout portion 74 is provided at a front end section of the side reinforcement portion 73 where the brake pedal 21 is disposed (see FIGS. 2 and 6). As described hereinbelow, this cutout portion 74 will prevent an interference between the steering bracket 7 and the first bracket 3 during the frontal collision.

The steering column 63 is supported by the steering bracket 7 at a rear support portion 8 in its rear position and at a front support portion 9 in its front position. The rear support portion 8 is a variable support portion which supports the steering column 63 (steering shaft 61) variably in its position in the substantially vertical direction with respect to the steering bracket 7 while the front support portion 9 includes a pivot portion which pivots the steering column 63 against the steering bracket 7.

The rear support portion 8, as shown in FIGS. 1, 2 and 5, is provided with a support member which is formed into a reverse hat-shaped section by a pair of vertical wall portions 81a, 81a spaced from each other in the vehicular width direction and spread in the vertical direction and attachment portions 81b spread in the horizontal direction from upper end portions of the respective vertical wall portions 81a.

At the respective attachment portions 81b, a concave groove 81c is formed opening toward its rear end and extending forwardly. A fastening bolt 55 is inserted through a front portion of this concave groove 81c. The attachment portions 81b, 81b are respectively affixed to the side reinforcement portions 72, 73 of the steering bracket 7.

At each vertical wall portion 81a, a guide groove 81d is formed extending vertically in a substantially center position of its longitudinal direction. Also between the pair of vertical wall portions 81a, 81a, the steering column 63 is inserted. To a lower portion of the steering column 63 which is positioned between these vertical wall portions 81a, 81a, a sliding member 82 of approximately rectangular section is affixed such as by welding. This sliding member 82 is allowed to slide in the vertical direction between the pair of vertical wall portions 81a, 81a. At opposite side wall portions of the sliding member 82, penetrating apertures are formed. Into the guide groove 81d and the penetrating apertures, a fastening bolt 83 extending in the vehicular width direction is inserted. A head portion 83a of this fastening bolt 83 is affixed to an outer surface of one of the vertical wall portions 81a of the support member 81 while the other end portion of the fastening bolt 83 protrudes out of the other one of the side wall portions 81a and is screwed to a nut member 84. An operating lever 85 is integrally affixed to this nut member 84. This operating lever 85 is fixed by a stopper nut 86 provided outside of the nut member 84.

The nut member 84 is tightened to the fastening bolt 83 by rotating the operating lever 85 in the positive direction, then the sliding member 82 becomes in a locked condition where it is sandwiched by the vertical wall portions 81a, 81a of the support member 81. This causes the steering column 63 to be fixed at a predetermined position. On the other hand by rotating the operating lever 85 in the negative direction, the nut member 84 is loosened against the fastening bolt 83 to be in an unlocked condition. This enables the fastening bolt 83 to move substantially vertically along the guide groove 81d and allows for the positioning adjustment of the steering column 63.

The front support portion 9, as shown in FIGS. 1, 2 and 6, has a pivot member 91 comprised of a gripping portion 91a gripping an intermediate portion of the steering column 63 and an arm portion 91b affixed to an upper portion of the gripping portion 91a and extending forwardly along the shaft axis direction.

The arm portion 91b of this pivot member 91 is positioned under the center wall portion 71 of the steering bracket 7 and between the pair of side reinforcement portions 72, 73 and its front end portion is pivoted against a side wall of each of the side reinforcement portion 72, 73 by a pivot shaft 92 extending in the vehicular width direction. Since in such a manner the arm portion 91b is arranged to extend forwardly along the shaft axis direction, a distance L1 between a pivot point and a variable support point of the steering column 63 (see FIG. 1) is lengthened. Since this makes a tiltable angular range of the steering column 63 (steering shaft 61) smaller, a variation of steering torque in case of the position of the steering wheel 62 being changed can be decreased. Vibration of the steering wheel 62 transmitted through the steering shaft 61 can also be decreased.

Further since the distance L1 between the pivot point and the variable support point is lengthened by extending the arm portion 91b along the shaft axis direction, the gripping portion 91a of the pivot member 91 can be positioned at the intermediate portion of the steering column 63. This can make a distance L2 of the collapse portion 66 positioned in front of the gripping portion 66 longer. Accordingly, an energy absorbing effect of the collapse portion 66 can be improved.

The function of the aforementioned embodiment will be described below. In a normal condition where the automotive vehicle does not collide, as shown with solid lines in FIGS. 1 and 3, the front end lower portion of the second bracket 4 is pivoted to the center lower portion of the first bracket 3 by way of the caulking pin 51. On the other hand, the upper portion of the second bracket 4 is tightened along with the upper portion of the first bracket 3 with the fastening bolt 54 to be affixed to the fixing member 34.

Particularly, as illustrated with solid lines in FIG. 4, the narrower portion 43a of the rear end of the elongated aperture 43 at the second bracket 4 is aligned with the rear end portion 33a of the elongated aperture 33 at the first bracket 3, the fastening bolt 54 is inserted into both of them and the fastening bolt 54 is tightened to the fastening member 34. Accordingly, the second bracket 4 is affixed to be unable to travel at both of the front end lower portion and upper portion, then a similar action to the normal one will be made when the driver steps to operate the brake pedal 21 during the automotive braking.

In contrast with this, when the automotive vehicle collides (during the frontal collision), the dash panel 11 moves rearwardly and the first bracket 3 affixed to the dash panel 11 moves rearwardly along with the second bracket 4. At this time, since the instrument panel member 12 does not move rearwardly and remains standing still in order to assure passenger space within the passenger compartment R2 even though the automotive collision, accompanied with the first and second brackets 3, 4 moving rearwardly, a rear end of the fixing member 34 contacts with the instrument panel member 12. On the other hand, the dash panel 11 causes the first and second brackets 3, 4 to continue moving, then only the fastening bolt 54, as shown with two-dot chain lines in FIG. 4, moves relatively forwardly from the rear end portion 33a within the elongated aperture 33 of the upper portion of the first bracket 3 and the upper portion of the first bracket 3 is in a fixed condition to the fixing member 34. But in the upper portion of the second bracket 4, the fastening bolt 54 moves relatively from the rear end narrower portion 43a to the front wider portion 43b within the elongated aperture 43, and the head portion 54a of the fastening bolt 54 passes out at the wider portion 43b.

This causes the attachment of only the upper portion of the second bracket 4 to be released among both of the bracket 3, 4. The upper portion is released away from the fixing member 34 and the first bracket 3, then the second bracket 4 becomes in a cantilever fashion where it is supported by the first bracket 3 only at the front end lower portion. In this condition, spring force of the coil spring 44, as illustrated by an arrow in FIG. 3, causes the second bracket 4 in the cantilever condition to fall down from the instrument panel member 12 while rotating rearwardly around a pivot point of the front end lower portion against the first bracket 3 along with the brake pedal 21. As a result of that, the brake pedal is rearwardly inclined so that the pedal portion 21a at its lower portion moves forwardly (see one-dot chain lines in FIG. 3).

Figure 7:
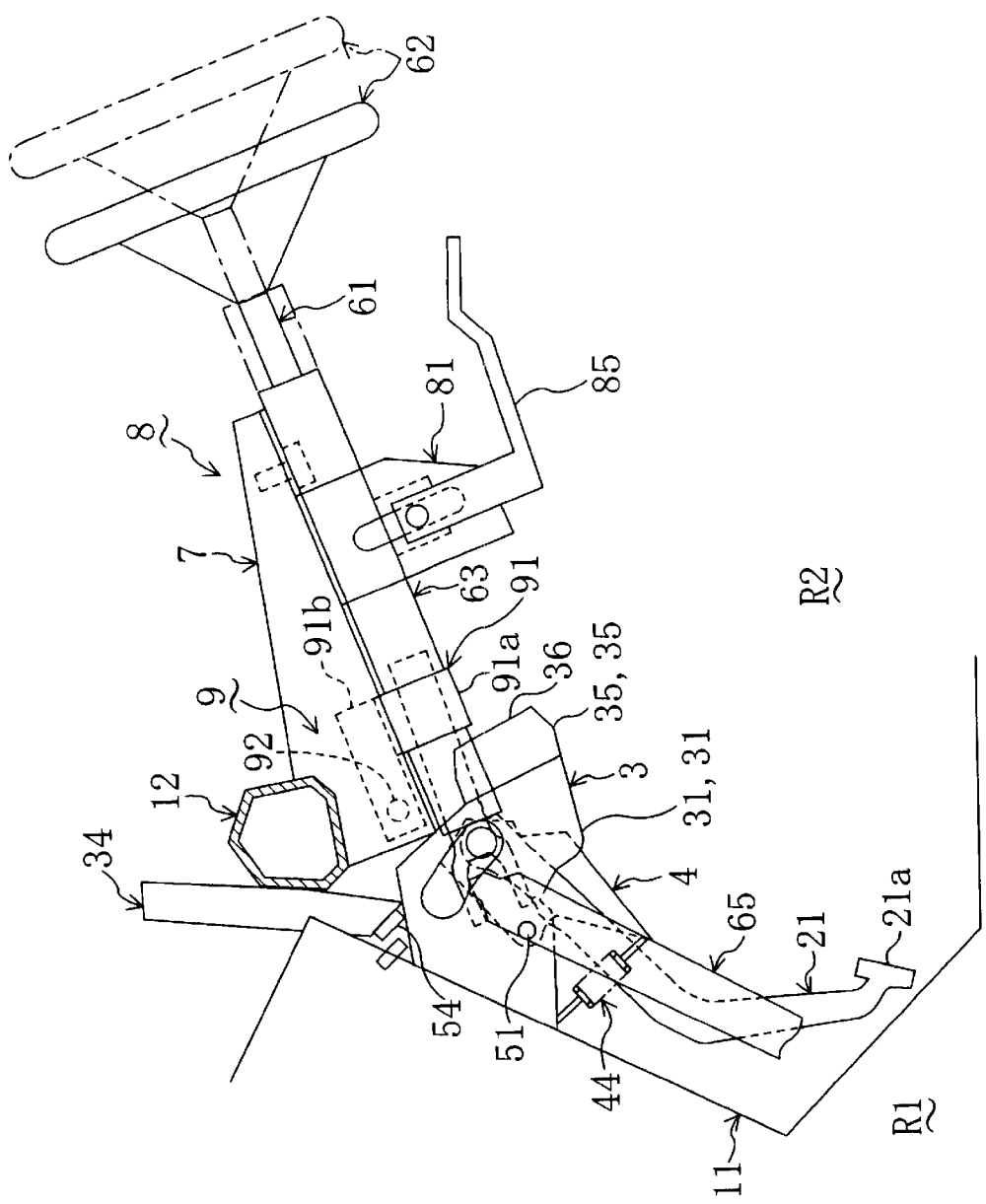
FIG. 7 is a side view illustrating a condition during an automotive collision corresponding to FIG. 1.
Figure 8:
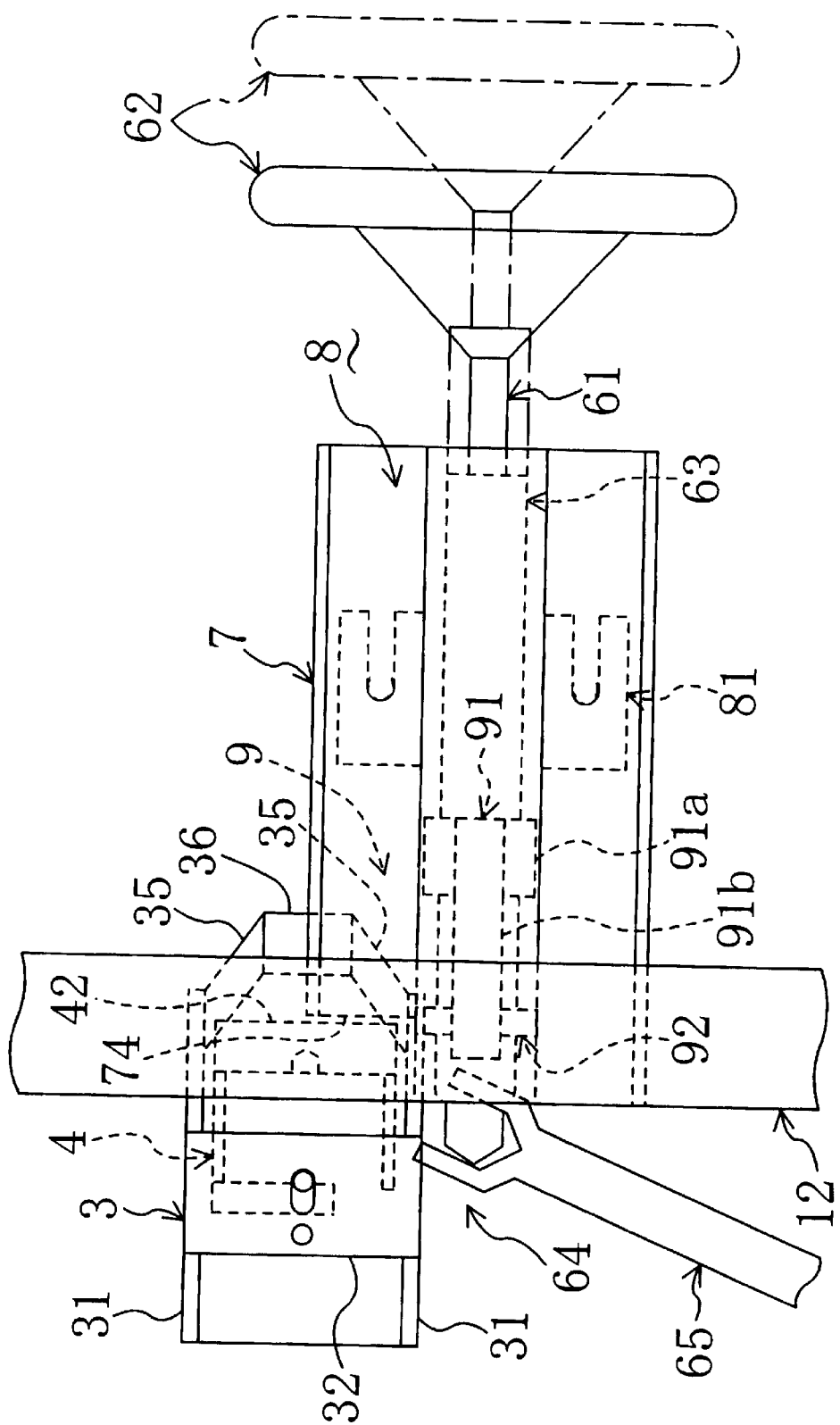
FIG. 8 is a plan view illustrating a condition during an automotive collision corresponding to FIG. 2.

On the other hand, when the first bracket 3 moves rearwardly, the universal joint 64 firstly contacts with the second side wall portion 35 and moves relatively with respect to the first bracket in the longitudinal direction along the side surface of this second side wall portion 35 (see an arrow of FIG. 2). After that the universal joint 64 further moves relatively along this side surface of the first side wall portion 31 while contacting with the first side wall portion 31. Because of this movement, the interference between the brake pedal 21, which is disposed oppositely to the universal joint 64 with respect to the first side wall portion 31, and the universal joint 64 is prevented by the first and second side wall portions 31, 35 (see FIGS. 7 and 8).

Further, since the universal joint 64 slidingly moves along the side surfaces of the first and second side wall portions 31, 35, the universal joint 64 is not pushed in the longitudinal direction or in the vehicular width direction. Accordingly, changing of the steering shaft 61 orientation can be certainly avoided.

Further, since the first bracket is provided with the connecting portion 36, the rigidity of the first and second wall portions 31, 35 in the vehicular width direction can be increased. Because of this, even if the universal joint 64 contacts with the first and second side wall portions 31, 35, these portions are not deformed, then the universal joint 64 can certainly slide along the side surfaces of the first and second side wall portions 31, 35. As a result, the interference between the brake pedal 21 and the universal joint 64 can be certainly avoided and the falling movement of the brake pedal 21 can be certainly made.

Further, since the cutout portion 84 is formed at the side reinforcement portion 73 of the steering bracket 7, even if the first bracket 3 moves rearwardly, the interference between the steering bracket 7 and the first bracket 3 is prevented. Because of this, a disadvantage accompanying with the interference between the steering bracket 7 and the first bracket 3, such as a failure of the brake pedal 21 falling down due to the deformation of the first bracket 3, can be avoided.

Further, although the collapse portion 66 is collapsed by the application of load to the steering shaft 61 in the shaft axis direction due to a secondary collision, the energy is effectively absorbed because of the length L2 of the collapse portion 66 as described above.

In this way, the interference between the brake pedal 21 and the universal joint 64 can be certainly avoided, and the universal joint 64 being pushed can also be certainly avoided. Accordingly, even though in a steering support structure where the orientation of the steering shaft 61 is likely to change during the frontal collision, the steering shaft 61 changing its orientation can certainly be avoided.

Although in the above described embodiment the first bracket 3 comprises the pair of first side wall portions 31, 31 and the pair of second side wall portions 35, 35, the first bracket 3 may only include at least a side wall portion disposed between the brake pedal 21 and the universal joint 64.

Also, the operating pedal is not limited to the brake pedal 21, but this invention can be applied to other operating pedals.

While the best mode for carrying out the invention has been described in detail, those familiar with the art to which this invention relates will recognize various alternative designs and embodiments for practicing the invention as defined by the following claims.

What we claim as our invention is:

1. An automotive pedal support structure comprising:

an operating pedal disposed behind a dash panel of an automotive vehicle;

a steering shaft including a universal joint disposed in the proximity of said operating pedal; and a first bracket comprising a pair of first side wall portions spaced apart with each other in the vehicular width direct n, a second side wall portion, and at least one connecting portion which connects said pair of first side wall portions in the vehicular width direction, said first bracket being mounted to said dash panel so as to extend rearwardly and being positioned generally at the same height as said universal joint, said second side wall portion being provided in a rear end of one of said pair of first said wall portions extending rearwardly and away from said universal joint, said second side wall portion being at a substantially same position in the longitudinal direction as said universal joint of the steering shaft;

wherein said operating pedal is positioned in front of said universal joint and rotatably pivoted to said first bracket between said pair of first side wall portions and opposite to said universal joint with respect to said first bracket; and said universal joint is positioned oppositely to said operating pedal with respect to either one of said first side all portions of said first bracket, said universal joint being arranged so that during an automotive frontal collision, said universal joint moves in the longitudinal direction relative to said first bracket while contacting one of said first and said second side wall portions of said first bracket with a rearward movement of said dash panel.

2. An automotive pedal support structure of claim 1, further comprising:

a second bracket with its front end lower portion being pivoted to said first bracket between said pair of side wall portions of said first bracket;

wherein said operating pedal includes a pedal portion at a lower end portion, said operating pedal being rotatably pivoted with respect to said second bracket, and an upper portion of said second bracket is detachably attached to a vehicular body member so that said second bracket falls down from the vehicular body member while rotating rearwardly around a pivot point of said front end lower portion against said first bracket and forwardly moves said pedal portion during an automotive frontal collision.

3. An automotive pedal support structure comprising:

an operating pedal disposable behind a dash panel of an automotive vehicle and having a pedal portion for a lower end portion;

a steering shaft including a universal joint disposed in the proximity of said operating pedal;

a first bracket comprising a pair of side wall portions, said first bracket being mounted to said dash panel so as to extend rearwardly with respect to a longitudinal direction of the vehicle, said first bracket being positioned generally at the same height as said universal joint; and a second bracket with its front end lower portion being pivoted to said first bracket between said pair of side wall portions of said first bracket and its upper portion being detachably attached to a vehicular body member so that said second bracket falls down from the vehicular body member while rotating rearwardly around a pivot point of the front end lower portion against the first bracket and forwardly moves said pedal portion during an automotive frontal collision;

wherein said operating pedal is positioned in front of said universal joint and rotatably pivoted with respect to said second bracket opposite to said universal joint with respect to said first bracket; and said universal joint is positioned oppositely to said operating pedal with respect to either one of said pair of side wall portions of said first bracket, said universal joint being arranged so that during an automotive frontal collision said universal joint moves in the longitudinal direction relative to said first bracket while contacting with said one of side wall portions of first bracket accompanied with a rearward movement of said dash panel.

4. An automotive pedal support structure of claim 3, further comprising:

a pivot portion which pivots said steering shaft with respect to a vehicular body member at a front position of said steering shaft and a variable support portion which supports said steering shaft variably in its position in the substantially vertical direction with respect to said vehicular body member at a rear position of said steering shaft.

* * * * *